United States Patent [19]

Lewis et al.

[11] Patent Number: 4,950,692
[45] Date of Patent: Aug. 21, 1990

[54] METHOD FOR RECONSTITUTING SUPERABSORBENT POLYMER FINES

[75] Inventors: William H. Lewis, Palos Heights; Kristy M. Bailey, Naperville, both of Ill.

[73] Assignee: Nalco Chemical Company, Naperville, Ill.

[21] Appl. No.: 286,115

[22] Filed: Dec. 19, 1988

[51] Int. Cl.$^5$ .............................................. C08J 11/06
[52] U.S. Cl. ...................................... 521/45; 521/40.5; 521/45.5; 528/499; 528/502
[58] Field of Search ................. 528/499, 502; 524/922; 521/45, 40.5, 45.5

[56] References Cited

U.S. PATENT DOCUMENTS

| | | | |
|---|---|---|---|
| 3,935,363 | 1/1976 | Burkholder et al. | 428/281 |
| 4,045,387 | 8/1977 | Fanta et al. | 524/922 |
| 4,064,071 | 12/1977 | Gilmour et al. | 252/455 R |
| 4,123,397 | 10/1978 | Jones | 260/17.4 GC |
| 4,272,422 | 6/1981 | Tanaka | 524/916 |
| 4,286,082 | 8/1981 | Tsubakimoto et al. | 526/240 |
| 4,354,487 | 10/1982 | Oczkowski et al. | 128/156 |
| 4,410,571 | 10/1983 | Korpman | 427/385.5 |
| 4,446,261 | 5/1984 | Yamasaki et al. | 524/40 |
| 4,514,510 | 5/1970 | Hoffman, Jr. | 264/117 |
| 4,587,284 | 5/1986 | Luisse et al. | 524/35 |
| 4,654,039 | 3/1987 | Brandt et al. | 604/368 |
| 4,698,404 | 10/1987 | Cramm et al. | 526/204 |
| 4,703,067 | 10/1987 | Mikita et al. | 521/63 |
| 4,771,089 | 9/1988 | Ofstead | 524/916 |

FOREIGN PATENT DOCUMENTS

| | | |
|---|---|---|
| 1109051 | 9/1981 | Canada . |
| 68684 | 1/1983 | European Pat. Off. . |
| 94842 | 11/1983 | European Pat. Off. . |
| 138427 | 4/1985 | European Pat. Off. . |
| 2051708 | 4/1971 | Fed. Rep. of Germany . |
| 2844956 | 4/1979 | Fed. Rep. of Germany . |
| 2173934 | 11/1973 | France . |
| 56-2846 | 1/1981 | Japan . |
| 428211 | 6/1983 | Sweden . |
| 1376091 | 12/1975 | United Kingdom . |
| 2021116 | 11/1979 | United Kingdom . |
| 2083487 | 3/1982 | United Kingdom . |

*Primary Examiner*—Allan M. Lieberman
*Attorney, Agent, or Firm*—Paul D. Greeley; Donald G. Epple; Anthony L. Cupoli

[57] ABSTRACT

A method for reconstituting superabsorbent polymer fines comprising the following steps: wetting the superabsorbent polymer fines sufficient to form a continuous amorphous gel of the fines; grinding the gel; and drying the gel which has been around to form a superabsorbent polymer material. Drying can optionally be followed by grinding and classification of the reconstituted superabsorbent polymer fines to desired sizes.

17 Claims, No Drawings

METHOD FOR RECONSTITUTING SUPERABSORBENT POLYMER FINES

BACKGROUND OF THE INVENTION

The present invention provides a novel method for recovering and reprocessing superabsorbent polymer fines. The method provides for the reconstitution of the fines back to superabsorbent polymers useful in applications, such as, diapers, sanitary napkins, soil additives, fuel filters, desiccants, cements, and sludge dewatering.

Hydrogel-forming polymer compositions (hereinafter referred to as superabsorbent polymers) are used as absorbents in absorbent structures and absorbent articles. Synthetic superabsorbent polymers are typically produced by one of the following methods: gel, inverse suspension, or modified bulk polymerization. Typical gel methods for producing superabsorbent polymers are described in U.S. Pat. Nos. 4,654,039 (Brandt et al.) issued Mar. 31, 1987, and 4,286,082 (Tsubakimoto et al.) issued Aug. 25, 1981. Typical inverse suspension processes for producing superabsorbent polymers are disclosed in U.S. Pat. Nos. 4,698,404 (Cramm et al.) issued Oct. 6, 1987, 4,446,261 (Yamasaki et al.) issued May 11, 1984, and 4,340,706 (Obayashi et al.) issued July 20, 1982. A modified bulk process is described in U.S. Pat. No. 4,703,067 (Mikita et al.) issued Oct. 27, 1987.

The Brandt et al. patent discloses a gel process comprising the steps of preparing a reaction mixture consisting essentially of particular amounts of unsaturated polymerizable acid group-containing monomers, crosslinking agent and optionally free radical initiator in an aqueous medium; subjecting this reaction mixture to polymerization conditions to produce a substantially water-insoluble, slightly crosslinked polymer material having under certain conditions particular gel volume, gel strength and extractable polymer content characteristics; and neutralizing at least a portion of the acid functional groups of the resulting polymer material with salt cations to form a partially neutralized polymer material having a degree of neutralization of at least 25%. The hydrogel material formed in accordance with the Brandt et al. patent may optionally be dried in order to prepare absorbent hydrogel-forming polymer materials which reform hydrogels upon subsequent contact with water or body fluids.

A typical inverse suspension process for producing superabsorbent polymers is disclosed in the Cramm et al. patent. This process provides for the suspending of an aqueous solution of acrylic acid and an alkali metal acrylate or ammonium acrylate, the mole ratio of the acrylic acid to the alkali metal acrylate or the ammonium acrylate being 50/50 to 2/98, in an alicyclic or aliphatic hydrocarbon solvent containing a surfactant having an HLB value of 8-12; subjecting the resulting suspension to inverse suspension polymerization in the presence of a water-soluble radical polymerization initiator and; if necessary, crosslinking the resulting polymer with a crosslinking agent, whereby the polymerization is conducted in the presence of a water-soluble chain transfer agent. The water-soluble chain transfer agent being formic acid.

Mikita et al. disclose a modified bulk process for producing superabsorbent polymers comprising the steps of combining potassium acrylate and a polyvinyl monomer with water in an amount of 55 to 80 combined weight percent of potassium acrylate and polyvinyl monomer based on the total weight of potassium acrylate, polyvinyl monomer and water to form a monomer mixture; and adding a polymerization initiator to the monomer mixture to initiate polymerization of the monomer mixture. The monomer mixture is polymerized without external heating by utilization of exothermic heat of reaction as substantially the only non-ambient energy source to drive water away from the polyacrylate resin to form the crosslinked polyacrylate resin having a water content sufficiently low, i.e., 15% or less, to be powdered, such as by pulverization, without an intermediate drying step.

Each of the aforementioned processes used to produce superabsorbent polymers may generate superabsorbent polymer fines. Superabsorbent polymer fines are defined as those particles which are too small in size for current market applications, e.g., diapers, sanitary napkins, etc. The fines may be generated either during the polymerization step of the process or during subsequent processing steps when the superabsorbent polymer is ground and sieved to meet desired particle size specifications.

As an example, in the production of superabsorbent polymer material for use as an absorbent in a certain personal product application all particles smaller than about +280 mesh are considered fines. Fines recovered from superabsorbent material used in this particular application may amount to between 5-35% of the total polymer produced.

Since superabsorbent fines are those particles which are too small in size for a specific market application, they are typically removed from a commercial product via a size classification step. The resulting fines are typically stored or disposed of until a suitable market can be found for them. Commercial applications of superabsorbent fines are limited by the small particle size which typically results in handling problems, such as, gel blocking and dusting.

Retaining fines in commercially used superabsorbent polymer material may also result in gel blocking, i.e., the fines block larger particles causing reduced absorbent capability of the total material. Due to gel blocking effects, fines are normally separated from the superabsorbent polymer material prior to commercial application.

Due to the high disposal, storage and handling costs associated with superabsorbent polymer fines, it is desirable to develop new methods for handling and utilizing these fines. The present inventors have discovered a novel process for recovering and reprocessing superabsorbent polymer fines making them suitable for commercial applications.

Others have attempted to convert polymer fines to commercially acceptable polymer material by agglomerating the fines together by either heating or addition of a chemical binder. One such agglomerating technique is disclosed in U.S. Pat. No. 3,514,510 (A. Hoffman) issued May 26, 1970. The Hoffman patent discloses a process wherein polymer fines are agglomerated in a fluidized bed maintained in a fluidized state with a mixture of two gases, the minor portion of which was heated above the polymer softening point, to cause agglomeration in a localized area. The polymer powder was agglomerated in a local area and the heavy agglomerate settled to the bottom of the fluidized bed and was withdrawn while fresh powder was added to the softening zone.

The problem with agglomerating polymer fines by heating or chemical binding is that attrition of the agglomerated particle may occur during commercial production or use. The severed fines are generally undesirable since they are typically smaller than the acceptable particle size range and may cause gel blocking and handling problems as described above.

Thus, the present invention provides a unique process which overcomes the disposal and handling problems associated with superabsorbent polymer fines, as well as avoids the attrition problems typically associated with agglomerated particles. The advantage of the present method is that the superabsorbent polymer fines are recovered and reconstituted into a commercially acceptable amorphous superabsorbent polymer material. Furthermore, the process of the present invention avoids the high cost and dust handling problems associated with storage, disposal and use of the fines. Additional advantages of the present invention shall become apparent as described below.

SUMMARY OF THE INVENTION

It is the primary object of the present invention to provide a method for reconstituting superabsorbent polymer fines which comprises the following; wetting the superabsorbent polymer fines sufficiently to form an amorphous gel of the fines; grinding the gel; and drying the ground gel product, thereby forming a superabsorbent polymer material suitable for commercial use as an absorbent in applications, such as, diapers, sanitary napkins, dish clothes, soil additives, fuel filters, coagulation of sludges, prevention of condensation(desiccants), and dehydration of oils.

It is also possible that the superabsorbent polymer fines may be reconstituted by wetting the superabsorbent polymer fines sufficiently to form an amorphous gel of the fines and thereafter combining the amorphous gel of fines with gel from an on-going gel polymerization process. The combining may take place either before or after the amorphous gel of fines has been wet ground.

As a preferred embodiment, the drying step may be followed by grinding of the superabsorbent polymer material to a size sufficient for commercial use. The dry grinding step may optionally be followed by classification of the dry ground material to recover particles of desired size. Undesirable particles may be recycled for further grinding or reprocessing.

The fines are preferably wetted with water, e.g., deionized water, to between about 5–70% solids, preferably between about 20–50% solids, and most preferably between about 35–45% solids. The water used in the wetting step preferably has a temperature in the range between about 65–160 degrees Fahrenheit, however, it is possible that temperatures outside of this range may also be used, i.e., slightly above freezing to boiling.

Additionally, the wetting step is preferably conducted under agitating conditions, whereby wetted superabsorbent polymer fines are agitated sufficiently to form an amorphous gel.

It is also an object of the present invention that the superabsorbent polymer fine gel is dried sufficiently to form a superabsorbent polymer material having a moisture content in the range between about 1–15%, preferably in the range between about 1–4%.

The superabsorbent polymer fines reprocessed in accordance with this method may be any starch graft superabsorbent polymer, synthetic superabsorbent polymer, or crosslinked superabsorbent polymer. The crosslinked polymer being a substantially water-insoluble, slightly crosslinked. partially neutralized, hydrogel-forming, polymer material, such as a crosslinked polyacrylate superabsorbent polymer.

The present invention may also include many additional feature which shall be further described below.

DESCRIPTION OF THE PREFERRED EMBODIMENTS

Superabsorbent polymers, such as synthetic superabsorbent polymers, starch graft superabsorbent polymers and crosslinked polyacrylate superabsorbent polymers may be used in applications, such as, diapers, sanitary napkins, soil additives, fuel filters, desiccants, cements, and sludge dewatering. During commercial production or use of such polymers a quantity of undesirably small particles called fines may be generated. Such fines may be generated during the polymerization step of the process, during subsequent processing steps when the superabsorbent polymer is ground and/or classified to meet desired particle size specifications or as a result of attrition during commercial production or use.

The present invention provides a novel method for recovering and reprocessing superabsorbent polymer fines. Any superabsorbent polymer fines may be reprocessed in accordance with this invention, although it is particularly suitable for starch graft superabsorbent polymers, synthetic superabsorbent polymers, and crosslinked superabsorbent polymers.

Superabsorbent polymer fines are generally substantially water-insoluble, slightly crosslinked, partially neutralized, hydrogel-forming, polymer material. One such crosslinked polymer is a crosslinked polyacrylate superabsorbent polymer. Polyacrylate superabsorbent polymers may be formed by polymerizing acrylic acid and/or alkali metal salts of acrylic acid alone or in combination with other monomers and/or crosslinkers which are known to be useful in the preparation of water absorbent polymers. Examples of these monomers include, but are not limited to, nonionic monomers like acrylamide, methyl methacrylate and N-vinyl pyrrolidone, sulfonated monomers like sodium acrylamidomethane sulfonate and sodium styrene sulfonate, and cationic monomers such as diallyldimethyl ammonium chloride and dimethylaminoethyl methacrylate-methyl chloride quaternary.

Other crosslinked superabsorbent polymers and methods for producing are set forth in U.S. Pat. Nos. 4,654,039, 4,286,082, 4,698,404, 4,446,261, and 4,703,067, all of which are incorporated herein by reference.

The present invention provides for reconstituting superabsorbent polymer fines by means of the following steps: wetting the superabsorbent polymer fines sufficiently to form a gel of the fines; grinding the gel; and drying the gel which has been ground, thereby forming a superabsorbent material suitable for commercial applications. Any superabsorbent polymer fines may be reprocessed in accordance with the method hereof, especially starch-graft superabsorbent polymer fines, synthetic superabsorbent polymer fines, and crosslinked polyacrylate superabsorbent fines.

Superabsorbent polymer fines may also be reconstituted by wetting the superabsorbent polymer fines sufficiently to form a gel of the fines and combining the gel of fines with a gel from an on-going gel polymerization process. The combination may take place either before or after the gel of fines is wet ground.

Optionally, the drying step may be followed by additional steps of dry grinding and size classification or separation to obtain particles of desired size.

The superabsorbent polymer fines are wetted or rewetted to a swollen state for the purpose of forming a continuous amorphous gel mass having no discrete particles. Preferably, the wetting of the fines should occur under agitating conditions sufficiently to disperse the liquid or other wetting agent throughout the fines to provide a uniform amorphous or homogeneous gel. Either water or deionized water may be used for the purpose of wetting the fines. The fines are wetted to between about 5-70% solids, preferably between about 20-50% solids, and most preferably between about 35-45% solids. The wetting agent, such as water, may have a temperature in the range between about 65-160 degrees Fahrenheit, although other temperatures may also be used.

The amorphous gel formed by wetting and swelling the fines under agitating conditions is thereafter ground by any conventional wet grinding device. The wet grinder minces or chops the amorphous gel to a particle size satisfactory for both the drying step and future processing requirements. It is also envisioned by the inventors that the minced amorphous gel may be diverted directly for combination with gel from an ongoing gel polymerization process.

The fines and water are preferably mixed to assure that all solids have been rewet sufficient to form a continuous amorphous gel. Mixing can be either by batch or continuous mixers. The mixing time required to obtain such a gel is dependent on the type of mixing device used.

The drying step takes place in either a belt dryer, tray dryer, fluid bed dryer, or any other means known to those skilled in the art. The gel is dried sufficiently to facilitate dry grinding thereof into superabsorbent polymer material. That is, the gel should be dried sufficiently form a superabsorbent polymer material with a moisture content in the range between about 1-15%, preferably between about 1-4%.

After the drying step, the superabsorbent polymer material can optionally be dry ground. Useful types of grinders include, but are not limited to, hammer mills, pin mills, ball mills and roller mills, such as, a twin roll grinder. The particles can be ground to any desired size depending on their pending application. Size separation of the superabsorbent polymer material reconstituted in accordance with this process permits the recycling of fines and oversized particles for additional reprocessing.

SEM micrographs demonstrate that the reconstituted superabsorbent polymer fines are not agglomerates of the fines, but amorphous, non-discrete, particles similar in structure to superabsorbent polymer particles formed by certain conventional methods, such as, gel polymerization processes. Thus, these reconstituted superabsorbent particles can be used either alone or mixed with conventionally formed particles in commercial applications.

EXAMPLE 1

Three samples were reconstituted at 20-25% solids. Samples 1, 2, and 3 were crosslinked polyacrylate superabsorbent polymer fines. Sample 4 was a control sample containing a crosslinked polyacrylate superabsorbent material.

Samples 1-3 were reprocessed using the following process: rewetting the superabsorbent polymer fines with deionized water at 20-25% solids in a five(5) gallon vessel; mixing the fines and water with a portable mixer for approximately one hour rewetting all solids and forming a gel; mincing the gel product via a Berkel Lab Mincer with a ¼" die; collecting the minced gel product on a dryer pan; drying the gel product in a forced circulation oven at 200-210 degrees Fahrenheit for 3-4 hours and drying the superabsorbent polymer material to between 4-5% moisture; manually breaking up the large particles; grinding the dry superabsorbent polymer material in a 6" twin roll grinder(STURTEUANT MILL); screening the milled material through a 20 mesh screen; returning +20 mesh to the mill for further reprocessing; and analyzing the product.

The deionized water temperature was varied between 65-160 degrees Fahrenheit. The data and results for samples 1- 3, as well as control sample 4, are set forth in Table 1 below.

TABLE 1

| Screen Analysis | Run #1 | Run #2 | Run #3 | Control |
| --- | --- | --- | --- | --- |
| +20 mesh | 2.8 | 3.0 | 2.3 | 1.3 |
| +40 mesh | 52.8 | 54.9 | 50.1 | 61.2 |
| +70 mesh | 25.4 | 24.8 | 26.6 | 26.6 |
| +140 mesh | 13.0 | 11.6 | 13.8 | 8.4 |
| +200 mesh | 2.45 | 2.2 | 2.9 | 1.1 |
| −200 mesh | 3.5 | 3.2 | 4.2 | 1.4 |

Run #1 - 20% solids, 150-160 deg. F. .028"gap
Run #2 - 20% solids, 70-75 deg. F. .028"gap
Run #3 - 25% solids, 65 deg. F. .028"gap
Control - .028"gap At 20-25% solids, the fines were reprocessed into amorphous superabsorbent particles similar in size to control sample 4.

Evaluation of the SEM micrographs of the samples showed that the reconstituted superabsorbent polymer fines are not aggregates; however, the particles are more porous than those of control sample 4.

EXAMPLE 2

In another experiment three samples of crosslinked polyacrylate superabsorbent polymer fines were reprocessed using the method of the present invention for reconstituting fines. A fourth sample, a crosslinked polyacrylate superabsorbent polymer was used as a control. Samples 1-3 were rewetted in a Nauta mixer (75 gallon) at 20, 30 and 35% solids, respectively. The agitator was set at 90 rpm to insure thorough wetting of the fines. Eventually, the superabsorbent polymer fines were charged in the Nauta mixer through a 12" port using a scoop. The fines were introduced slowly so that they would mix with the water to form a continuous amorphous gel. Once all of the water and fines were added to the mixer, mixing continued for 30 minutes. The resultant gel was thereafter transferred to a Berkel Lab Mincer with a ¼" die for grinding the gel. The ground or chopped gel product was thereafter dried in a forced circulation oven at about 200-210 deg. F. for approximately 2-5 hours until the moisture content thereof reached approximately 5%. The dried superabsorbent material was then ground in a twin roll mill having a gap setting of 0.028". This was followed by screening of the ground material to desired size specification through a 20 mesh screen, returning +20 mesh to the mill for further milling.

The results for the samples are set forth below in Table 2.

TABLE 2

|  | RUN #1 | RUN #2 | RUN #3 | Control |
|---|---|---|---|---|
| Mixer | Nauta | Nauta | Nauta | Plant |
| % Solids | 20.0 | 30.0 | 35.0 | — |
| Temp. deg. F. | 84.0 | 90.0 | 104.0 | — |
| Prod. Moisture | 2.8 | 3.9 | 4.9 | — |
| Particle Size: |  |  |  |  |
| +14 mesh | 0.1 | 0.2 | 0.6 | 0.0 |
| +20 mesh | 0.8 | 0.6 | 5.0 | 0.2 |
| +50 mesh | 68.7 | 60.5 | 63.5 | 70.5 |
| +100 mesh | 18.4 | 25.0 | 16.6 | 18.9 |
| +325 mesh | 11.4 | 12.8 | 12.9 | 9.8 |
| −325 mesh | 0.6 | 0.9 | 1.4 | 0.7 |

EXAMPLE 3

Samples of superabsorbent polyacrylate fines were reprocessed in accordance with the steps set forth above in Examples 1 and 2, except that instead of a batch mixer the fines and water were agitated by means of a 5" diameter continuous twin screw mixer. Six(6) samples were run at 30-38% solids. The results of the six(6) runs are set forth below in Table 3.

TABLE 3

|  | RUN 1 | RUN 2 | RUN 3 | RUN 4 | RUN 5 | RUN 6 |
|---|---|---|---|---|---|---|
| +20 mesh | 0.8 | 0.7 | 1.2 | 0.2 | 0.1 | 0.7 |
| +50 mesh | 59.8 | 53.6 | 65.9 | 44.4 | 38.2 | 53.2 |
| +100 mesh | 22.8 | 25.8 | 18.5 | 27.5 | 25.3 | 24.3 |
| +200 mesh | 12.7 | 14.4 | 9.9 | 18.1 | 21.6 | 14.8 |
| +325 mesh | 3.4 | 4.6 | 3.6 | 7.2 | 10.4 | 5.7 |
| −325 mesh | 0.4 | 1.1 | 0.9 | 2.6 | 4.2 | 1.7 |
| Feed Solids | 30 | 36 | 35 | 35 | 38 | 35 |

While we have shown and described several embodiments in accordance with our invention, it is to be clearly understood that the same are susceptible to numerous changes and modifications apparent to one skilled in the art. Therefore, we do not wish to be limited to the details shown and described but intend to show all changes and modifications which come within the scope of the appended claims.

What is claimed is:

1. A method for reprocessing superabsorbent polymer fines, said superabsorbent polymer fines being selected from the group consisting of starch graft superabsorbent polymers, synthetic superabsorbent polymers, and crosslinked superabsorbent polymers, comprising the following steps:
    wetting said superabsorbent copolymer fines with water to a swollen state sufficiently to form a continuous amorphous gel of said fines;
    grinding said gel; and
    drying the ground gel particles to form a superabsorbent polymer material having a moisture content between about 1 to 15%.

2. The method according to claim 1, wherein the step of drying is followed by grinding said superabsorbent polymer material.

3. The method according to claim 2, wherein said superabsorbent polymer material is ground by a twin roll grinder.

4. The method according to claim 2, wherein the step of grinding said superabsorbent polymer material is followed by size classification of the ground superabsorbent polymer material, whereby particles of desired size are captured.

5. The method according to claim 1, wherein said water is deionized water.

6. The method according to claim 1, wherein said superabsorbent polymer fines are wetted to between about 5-70% solids.

7. The method according to claim 6, wherein said superabsorbent polymer fines are wetted to between about 20-50% solids.

8. The method according to claim 7, wherein said superabsorbent polymer fines are most wetted to between about 35-45% solids.

9. The method according to claim 1, wherein said wetting step takes place under agitating conditions.

10. The method according to claim 1, wherein said water has a temperature in the range between about slightly above freezing to boiling.

11. The method according to claim 10, wherein said water has a temperature in the range between about 65°-160° Fahrenheit.

12. The method according to claim 1, wherein said gel is dried by either a belt dryer, tray dryer, or fluid bed dryer.

13. The method according to claim 1, wherein said gel is dried sufficiently to form a superabsorbent polymer material with a moisture content in the range between about 1-4%.

14. The method according to claim 14, wherein said crosslinked superabsorbent polymers are substantially water-insoluble, slightly crosslinked, partially neutralized, hydrogel-forming, polymer materials.

15. The method according to claim 14, wherein said cross-linked superabsorbent polymer is a crosslinked polyacrylate superabsorbent polymer.

16. A method for reprocessing superabsorbent polymer fines, said superabsorbent polymer fines being selected from the group consisting of starch graft superabsorbent polymers, synthetic superabsorbent polymers, and crosslinked superabsorbent polymers, comprising the following steps:
    wetting said superabsorbent polymer fines with water to a swollen state sufficiently to form a continuous amorphous gel of said fines; and
    combining said gel of fines with a gel from an ongoing superabsorbent polymerization process.

17. The method according to claim 16, wherein said gel of fines is ground prior to combining with said gel from an on-going superabsorbent polymerization process.

* * * * *

UNITED STATES PATENT AND TRADEMARK OFFICE
CERTIFICATE OF CORRECTION

PATENT NO. : 4,950,692

DATED : August 21, 1990

INVENTOR(S) : William H. Lewis and Kristy M. Bailey

It is certified that error appears in the above-identified patent and that said Letters Patent is hereby corrected as shown below:

Col. 3, line 25, delete ";" and insert therefor --- : ---.

Col. 4, line 6, delete "feature" and insert therefor --- features ---.

Col. 5, line 39, insert --- to --- before "form".

IN THE CLAIMS:

Col. 7, claim 1, line 7, delete "copolymer" and insert --polymer--.

Col. 8, claim 14, line 1, delete "claim 14" and insert therefor --claim 1--.

Signed and Sealed this

Third Day of December, 1991

Attest:

HARRY F. MANBECK, JR.

Attesting Officer      Commissioner of Patents and Trademarks